(12) United States Patent
Ritter et al.

(10) Patent No.: US 9,158,932 B2
(45) Date of Patent: Oct. 13, 2015

(54) MODELED AUTHORIZATION CHECK IMPLEMENTED WITH UI FRAMEWORK

(71) Applicant: SAP AG, Walldorf (DE)

(72) Inventors: Gerd Ritter, Heidelberg (DE); Peter Dell, Lebach (DE); Stefan Schmid, Rauenberg (DE)

(73) Assignee: SAP SE, Walldorf (DE)

( * ) Notice: Subject to any disclaimer, the term of this patent is extended or adjusted under 35 U.S.C. 154(b) by 297 days.

(21) Appl. No.: 13/889,509

(22) Filed: May 8, 2013

(65) Prior Publication Data

US 2014/0337384 A1    Nov. 13, 2014

(51) Int. Cl.
*G06F 17/30* (2006.01)
*G06F 21/62* (2013.01)

(52) U.S. Cl.
CPC .................. *G06F 21/6218* (2013.01)

(58) Field of Classification Search
CPC ..... G06F 21/12; G06F 21/52; G06F 21/6227; G06F 2221/2149; G06F 17/30389
USPC .................................. 707/759, 783
See application file for complete search history.

(56) References Cited

U.S. PATENT DOCUMENTS

| | | | | |
|---|---|---|---|---|
| 5,335,346 | A * | 8/1994 | Fabbio | 711/163 |
| 6,910,041 | B2 | 6/2005 | Exton et al. | |
| 7,426,597 | B1 * | 9/2008 | Tsu et al. | 710/307 |
| 7,451,403 | B1 * | 11/2008 | Srinivasan et al. | 715/763 |
| 7,831,918 | B2 * | 11/2010 | Marini | 715/762 |
| 8,103,536 | B2 | 1/2012 | Green et al. | |
| 8,170,901 | B2 | 5/2012 | Shukla et al. | |
| 8,326,874 | B2 | 12/2012 | Wright et al. | |
| 8,396,751 | B2 | 3/2013 | Becker et al. | |
| 8,429,597 | B2 | 4/2013 | Prigge | |
| 8,438,238 | B2 | 5/2013 | Moser et al. | |
| 8,578,278 | B2 * | 11/2013 | Rauh et al. | 715/744 |
| 2003/0135730 | A1 | 7/2003 | Szucs et al. | |

(Continued)

FOREIGN PATENT DOCUMENTS

EP    1626324 A2    2/2006

OTHER PUBLICATIONS

Internet article, "Authorization Checks," retrieved from: http://help.sap.com/saphelp_nw04/helpdata/en/52/67129f439b11d1896f0000e8322d00/content.htm; printed on May 7, 2013.

(Continued)

*Primary Examiner* — Debbie Le
(74) *Attorney, Agent, or Firm* — Fountainhead Law Group PC

(57) ABSTRACT

Access by a user to a database layer, is governed by modeled authorization checking implemented with authorization objects present in an overlying application layer. At design time, the authorization checking is modeled as part of an existing user interface (UI) model, which may conform to a Model, View, and Control (MVC) design pattern. Authorization objects created during design time, are stored in a meta data repository. At runtime, an authorization engine references the authorization objects and the operations supported by those authorization objects. The authorization check is thus implemented centrally in the UI framework itself using this modeled information. Embodiments avoid complexity, potential lack of internal consistency, and low visibility of conventional de-centralized authorization checking schemes that rely upon a plurality of enforcement points hard-coded at multiple locations within application logic.

11 Claims, 5 Drawing Sheets

(56) References Cited

U.S. PATENT DOCUMENTS

| | | |
|---|---|---|
| 2006/0095892 A1* | 5/2006 | Banavar et al. .............. 717/109 |
| 2010/0131916 A1* | 5/2010 | Prigge .......................... 717/104 |
| 2011/0231921 A1 | 9/2011 | Narayanan et al. |
| 2011/0246444 A1 | 10/2011 | Jenkins et al. |
| 2011/0307348 A1 | 12/2011 | Seubert et al. |
| 2012/0167178 A1 | 6/2012 | Rauh et al. |
| 2012/0167200 A1 | 6/2012 | Buchholz et al. |
| 2014/0181134 A1* | 6/2014 | Hermanns et al. ........... 707/759 |

OTHER PUBLICATIONS

Internet article, "Programming Authorization Checks," retrieved from: http://help.sap.com/saphelp_nw04/helpdata/en/52/6712ac439b112d1896f0000e8322d00/content.htm; printed on May 7, 2013.

Internet article, Authority-Check, retrieved from: http://help.sap.com/abapdocu_70/en/ABAPAUTHORITY-CHECK.htm; printed on May 7, 2013.

* cited by examiner

Authorization Role: SALES

[ Save and Close ] [ Save ] [ Close ] [ Check ] [ Copy ] [ Actions ]

Authorization Objects   UIs   Reports

[ Add Row ] | [ Remove ]

Assigned Authorization Object

- Opportunity ← 202
- Account ← 201

Operation Restrictions   Field Restrictions

| Operation | Restriction | | Relevant Restriction |
|---|---|---|---|
| Read | ○ | Unrestricted | Read |
| Write | ○ | Restricted | Write |
| Find | ○ | Unrestricted | Read |
| Create | ○ | Restricted | Write |
| Delete ← 204 | ○ | Restricted | Write |
| Export Data | ○ | Restricted | Read |
| Change Owner | ○ | No Access | Write |

MODELED AUTHORIZATION CHECK IMPLEMENTED WITH UI FRAMEWORK

BACKGROUND

Embodiments of the present invention relate to accessing database information in a secure manner, and in particular, to implementation of modeled authorization checking in a user interface framework.

Unless otherwise indicated herein, the approaches described in this section are not prior art to the claims in this application and are not admitted to be prior art by inclusion in this section.

Databases offer an attractive and flexible way of making large volumes of data available to potential users. However, all users are not entitled to the same privileges in accessing data in a database.

For example, while some users may be allowed to create and/or change stored data, other users may be limited to only viewing the data. Still other users may not be granted the ability to view certain types of stored information.

Authorization checks are commonly used to govern access to documents or master data, and thereby control the circulation of information. For example, in an Enterprise Resource Planning (ERP) system, only a particular subset of employees may be authorized to view and/or edit stored business opportunity data of the sales organization "North America".

In another example, account or financial information may be restricted to employees of a given company. In still another example, creation, deletion, and/or downloading of sales opportunities, may be allowed internally for only a certain number of employees.

Authorization checks are performed by calling authorization objects. Traditionally, such authorization objects rely upon a plurality of enforcement points within the code of the various logic modules making up an individual application (e.g. an ERP system).

This conventional, de-centralized approached to authorization checking can raise certain issues. One potential drawback is difficulty in establishing a compact, comprehensive "where-used-list" or, establishing which authorizations are actually required for a user to perform the daily work or view a screen. This lack of transparency makes it difficult for developers/partners/customers to foresee authorization changes or enhancements, and to maintain authorizations by the administrator.

For example, a particular user may access the database and press an "Export to Excel™" button. Under such circumstances, the conventional authorization checks that are executed are not visible directly from the user interface (UI) meta data. The resulting lack of transparency makes it difficult for partners and customers to foresee authorization changes or enhancements.

Accordingly, the present disclosure addresses these and other issues with the use of a modeled authorization check in a user interface framework.

SUMMARY

Access by a user to a database layer, is governed by modeled authorization checking implemented with authorization objects present in an overlying application layer. At design time, the authorization checking is modeled as part of an existing user interface (UI) model, which may conform to a Model, View, and Control (MVC) design pattern. Authorization objects created during design time, are stored in a meta data repository. At runtime, an authorization engine references the authorization objects and the operations supported by those authorization objects. The authorization check is thus implemented centrally in the UI framework itself using this modeled information. Embodiments avoid complexity, potential lack of internal consistency, and low visibility of conventional de-centralized authorization checking schemes that rely upon a plurality of enforcement points hard-coded at multiple locations within application logic.

An embodiment of a computer-implemented method comprises providing an authorization meta data model comprising an authorization binding, in an application layer overlying a database layer. An authorization object is provided in a meta data repository. A single authorization enforcement point is provided in the application layer. In response to an authorization request received at the single authorization enforcement point, an authorization engine is caused to reference the authorization object. Based upon processing of the authorization object by the authorization engine, the authorization engine is caused to provide an authorization.

An embodiment of a non-transitory computer readable storage medium embodies a computer program for performing a method. The method comprises providing an authorization meta data model comprising an authorization binding, in an application layer overlying a database layer. An authorization object is provided in a meta data repository. A single authorization enforcement point is provided in the application layer. In response to an authorization request received at the single authorization enforcement point, an authorization engine is caused to reference the authorization object. Based upon processing of the authorization object by the authorization engine, the authorization engine is caused to provide an authorization.

An embodiment of a computer system comprises one or more processors and a software program, executable on said computer system. The software program is configured to provide an authorization meta data model comprising an authorization binding, in an application layer overlying a database layer. The software program is configured to provide an authorization object in a meta data repository. The software program is also configured to provide a single authorization enforcement point in the application layer. In response to an authorization request received at the single authorization enforcement point, the software program is configured to cause an authorization engine to reference the authorization object. Based upon processing of the authorization object by the authorization engine, the software program is configured to cause the authorization engine to provide an authorization.

According to certain embodiments the authorization meta data model is bound to an existing user interface (UI) meta data model.

In some embodiments the authorization meta data model is part of a Model, View, and Control (MVC) design comprising a data model including a first authorization binding, a layout, and an event model including a second authorization binding.

In particular embodiments the authorization object comprises a document, and the authorization applies to an entire document instance.

In some embodiments, the authorization object comprises a business partner or an organizational center.

According to various embodiments the authorization object comprises a document and an operation to be performed on the document, and the authorization applies to the operation.

In certain embodiments the authorization request is received in conjunction with a database query, and authorization engine enhances the database query according to the authorization.

BRIEF DESCRIPTION OF THE DRAWINGS

FIG. 2 shows a screen shot of a system according to an embodiment.

DETAILED DESCRIPTION

Described herein are techniques for implementation of modeled authorization checking to allow access to data stored in an underlying database. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
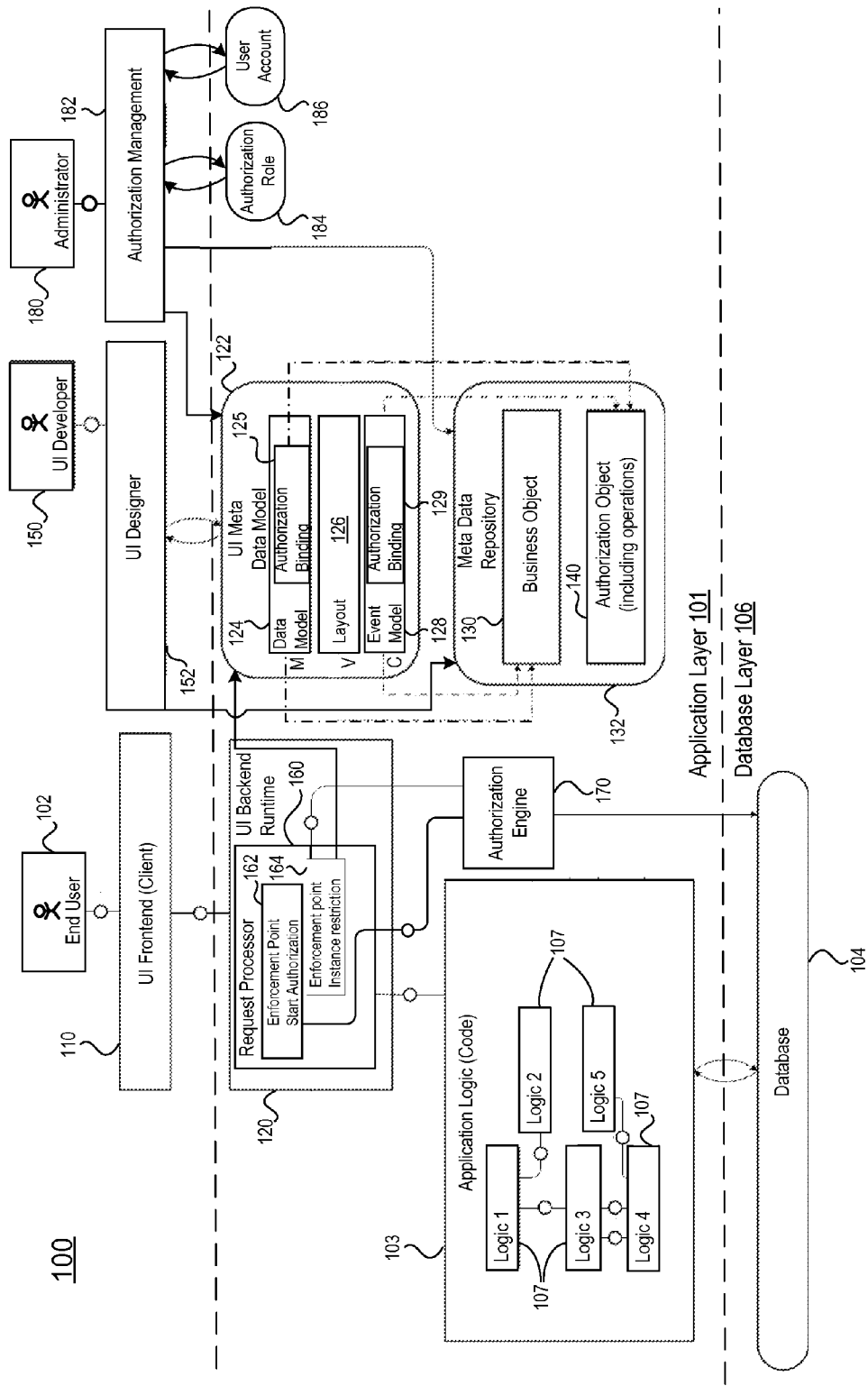
FIG. 1 shows a simplified view of a database system configured to implement modeled authorization checking according to an embodiment.

According to embodiments, access by a user to information stored in a database layer, is governed by modeled authorization checking that is implemented in an application layer. FIG. 1 shows a simplified view of a system 100 for performing authorization checking according to an embodiment. FIG. 1 is organized such that the left-side shows runtime and the role an end user, the center shows design time and the role of a UI developer, and the right-side shows authorization administration and the role of an administrator.

FIG. 1 shows an end user 102, who is seeking to work with a business application 103 (e.g. an ERP program) present in an application layer 101. The business application relies upon data stored in a remote database 104 of an underlying database layer 106. The internal structure of the business application is broken up into a plurality of logic modules 107 (here shown simplified as five in number) that interact with one another.

In order to access the business application of the application layer, during runtime the End User 102 communicates through a User Interface (UI) Frontend (Client) 110 with a User Interface (UI) Backend 120, that is configured to receive a request from the user. The UI Backend in turn is in communication with a Meta Data Model 122 of the user interface.

The UI Meta Data Model is organized according to a Model View Control (MVC) design. In particular, a Model (M) component 124 comprises the data model that is configured to describe the data elements and data structure used within the UI (for example, an amount data field).

A View (V) component 126 of the UI model comprises the layout of the interface. A Control (C) component 128 comprises an event model configured to model the events occurring in the UI model (for example triggered by buttons on the UI), and to define the reaction on those events and their orchestration.

The Model component 124 and the Control component 128 are in communication with a Business Object 130 stored within a Meta Data Repository 132. In particular, the Business Object 130 provides a structure for the data being accessed and manipulated according to the specific logic of the Business Application. Events from the UI event model often refer to data changes, actions, or queries of the Business Object.

According to embodiments, the data model 122 may be modified to create an authorization checking model. In particular, the Model component 124 of the data model may be modified to include authorization binding 125 capability. The Control component 128 of the data model may also be modified to include authorization binding 129 capability.

The Model component 124 and the Control component 128 are in communication with an Authorization Object 140 stored within the Meta Data Repository 132. In particular, the Authorization Object 130 stores data relevant to authorization checking, according to a specific data structure. Authorization checks can apply to an entire document instance (read or write), or to certain operations to be performed on the document (such as release of a sales quote, or an export to Excel™).

At design time, a UI developer 150 may access the UI Meta Data Model through a UI designer interface 152. This allows the authorization checking to be modeled as part of a user interface (UI) model, with the authorization objects stored in a meta data repository. One possible example of an authorization object may store data relevant to authorization such as job title, group affiliation, and/or scope of access rights.

Here, it is noted that the UI designer not only reads but also writes the UI model (since she/he is modeling it). By contrast, the key user maintaining the authorization no longer modifies the UI itself, but only accesses read-only in order to acquire the required UI meta data information At runtime, a particular End User may attempt to access the business application via the UI Backend. A Request Processor 160 present in the UI Backend, may accordingly implement an authorization check to determine the extent of access (if any) of the End User to the data in the database. This authorization check may comprise two (2) stages.

A first stage comprises a single Enforcement Point Start Authorization 162. In this first stage, a first input is provided to the authorization engine 170 to begin the authorization process.

Here, the authorization engine is shown on its own within the application layer. The authorization engine is independent because it is also useable by elements other than the UI. An example of such another element is a web service that is created to accommodate as-yet unforeseen extensions.

The Enforcement Point Start Authorization 162 checks to see if the user has authorization at all to start the corresponding UI, independent on particular data to be displayed in this screen. The output of the authorization engine at this first stage will be simply yes or no.

A second stage comprises a single Enforcement Point Instance Restriction 164. In this second stage, a second input is provided to the authorization engine 170 to continue the authorization checking process.

This second input to the authorization engine can be a set of data. Alternatively or in conjunction with receiving such data set, the authorization engine might request additional data from the application layer and/or database layer.

The request processor is caused to contact the UI Meta Data Model. The authorization bindings 125 and 129 of the Model component and the Control component, respectively, reference the Authorization Object.

The second authorization stage is instance-related. Authorization is accordingly decided based upon attributes of a business object and the attributes of the instance (for example the employee responsible for a sales order). The authorization object defines the operations which are restricted. The corresponding restrictions (e.g. "Edit only for Sales Org 411") are then matched against the attributes (e.g. "Sales Org ID") of the business object.

In one example, a user may be allowed to view a particular sales order based upon an authorization object. In another example, a user may be allowed to perform an event (e.g. release) a particular sales quote.

In this manner, operations may be related to an entire instance (e.g. read, write). Or, operations may be related to specific operations (e.g. release, export to Excel™).

For each of the operations of the authorization objects which are used within the UI screen ("model"), the authorization engine will return which authorizations the user actually has. For events, examples of authorization can include enabled/disabled. For data fields: examples of authorization can include enabled/disabled, or read-only/writeable. These are shown in the operations specifically indicated in FIG. 2 of the Example described below.

Figure 1A:
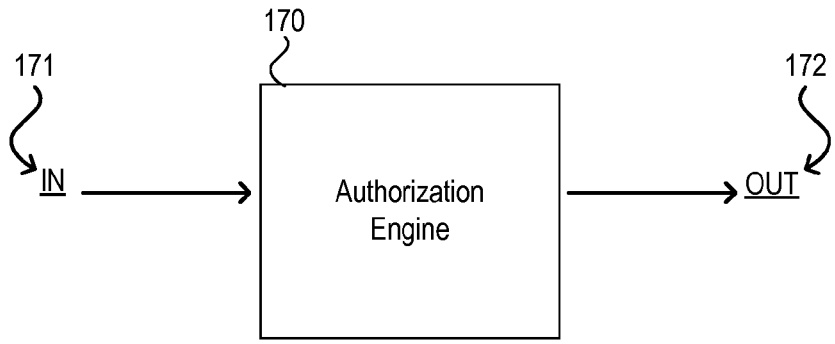
FIG. 1A shows an enlarged view of the authorization engine according to an embodiment.

The role of the authorization engine according to an embodiment may be summarized with reference to FIG. 1A, which shows an enlarged view. In particular, the authorization engine is configured to receive one or more inputs 171.

Input parameters of the authorization engine are typically data related to the instance to be read. Examples include but are not limited to:
 the sales organization of a sales order;
 the employee responsible, and the territory responsible, in an opportunity;
 the account of the opportunity.

In certain embodiments, the authorization engine might also retrieve this information by a call back. However, this can be done only if a document reference is provided.

Also input to the authorization engine, are the operations (or the authorization object as grouping), for which the application wants to know the authorizations of the user. This is derived from the UI model.

In response to these inputs, the authorization engine is configured to perform processing to produce one or more corresponding outputs 172 comprising the authorizations of the user. The authorization engine might access the application layer or database layer to retrieve the maintained authorizations of the user, and evaluate them in the current context.

A slightly different approach may be employed for queries. In that context, the authorization engine may be called on to enhance the query by the restrictions of the user.

For example, an authorization object may indicate that a particular user is only allowed to view sales orders with the sales organization=MC421 "New York". Then, the query is enhanced by an additional condition "AND SALES_ORG_ID='MC241'. In certain embodiments this query addition might be also operated on a technical additional search field, which also includes the reference of the sales organization.

Figure 1B:
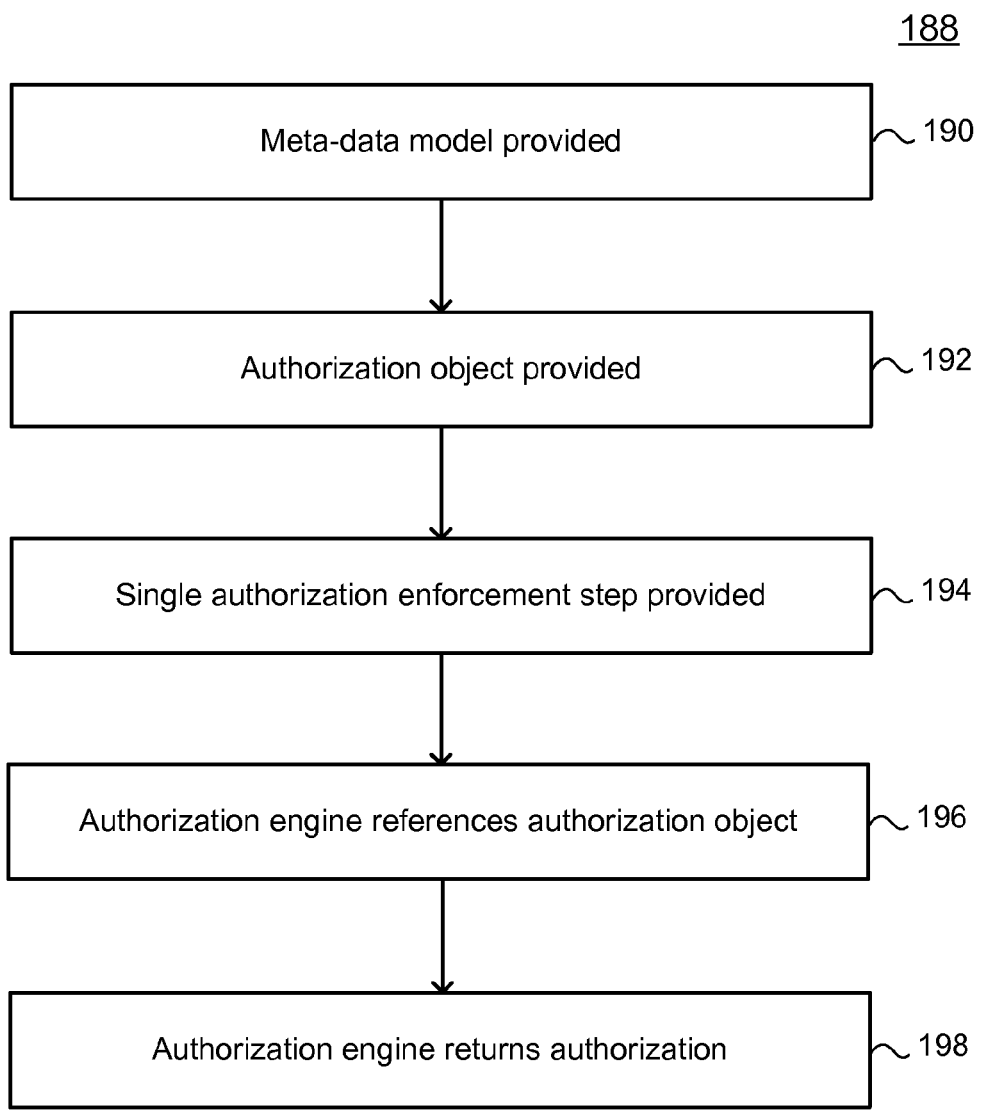
FIG. 1B shows a simplified view of a process flow according to an embodiment.

FIG. 1B shows a simplified view of a process flow 188 according to an embodiment. In a first step 190, an authorization meta data model comprising an authorization binding, is provided in an application layer overlying a database layer.

In a second step 192, an authorization object is provided in a meta data repository accessible to the authorization meta data model. In a third step 194, a single authorization enforcement point is provided in the application layer. In response to an authorization request received from a user at the single authorization enforcement point, in step 196 an authorization engine is caused to reference the authorization object.

Based upon processing of the authorization object by the authorization engine, in step 198 the authorization engine is caused to return an authorization to the user. As employed herein, while the term "authorization" may refer to the affirmative grant of some level of access, "authorization" may also refer to denial of access to a user.

FIG. 1 also shows the UI Meta Data Model 122 and the Meta Data Repository 132 of the application layer, as being accessible to a system administrator 180 via authorization management interface 182. These connections allow the administrator to interact with the authorization checking scheme.

That authorization management interface 182 is also available to perform other tasks. Examples may include but are not limited to defining authorization roles 184 and defining user accounts 186.

Example

An example of an embodiment of authorization checking that is implemented through modeling, is now presented. In particular, FIG. 2 shows a sample screen shot 200 of an interface that allows an ERP system administrator, to implement modeled authorization checking according to an embodiment.

Here, the modeled authorization scheme includes an authorization object "Account" 201 and the authorization object "Opportunity" 202. The "Opportunity" authorization object in turn supports the following operations: "Read", "Write" (selected), "Find", "Create", "Delete", "Export Data" 204, and "Change Owner". This is meta data information.

During design time, the UI designer can explicitly assign the corresponding operation to a UI button on the floor plan. For example, the "Export to Excel™" download button could be bound to the "Export data" operation 204 of the authorization object "Opportunity". This allows the authorization check to be performed by the UI framework in the backend, without requiring additional code.

Furthermore the authorization information is transparent and extensible for other developers, partners, and customers. Thus in a partner solution, that partner could then enforce authorization checks for other operations (created by the partner or by the software vendor), in the same transparent and consistent manner without the necessity for adding code to the application. This allows derivation directly of which authorizations are actually required, so that the end user can perform job functions.

In certain embodiments, such an "Export to Excel™" download button may not be bound directly to the business object model, but may instead exist only in the UI model. Even under such circumstances, however, according to an embodiment the authorization check can still be assigned. This is then done based on the UI model entity, that is the event assigned to the button.

Model-based authorization checking according to various embodiments, may offer certain benefits. For example, conventional authorization checking approaches may impose constraints on extensibility by partners, due to a lack of transparency of the existing authorization check, and a lack of ability to overrule authorization checks in a modeled way.

By contrast, embodiments may offer transparency of authorization checks. This can aid in visualization of the authorization process for development, testers, partners, and customers. This transparency can also support modeled extensibility of authorization checks by partners and customers.

It is further noted that in conventional approaches, explicit code is required in case additional authorization checks shall be introduced on a floorplan, either by the software vendor, partners, or customers. By contrast, model-based authorization checking according to embodiments as described herein, may require no application specific, partner, or customer coding for implementation.

It is also noted that conventional authorization checking approaches may encounter difficulty in establishing a compact, comprehensive where-used-list as information or preparation for changes. By contrast, embodiments may provide meaningful where-used-lists for authorization checks (authorization objects and operations). These lists point not only to programs/classes/WDY (plain code), but also to modeled entities.

Another possible drawback of conventional authorization checking approaches, is that central performance optimizations may be difficult to achieve. The context of the UI is not referenced in the conventional authorization check via the BO layer. In a sales order UI, if that order has already been checked once, then it is not required to check it again.

However, such information is only available in the UI layer. That is, the BO service provider does not have the context of the UI framework indicating that the sales order shown on this UI will never change, and therefore, authorization check can be restricted to the start of the UI screen.

By contrast, implementing the authorization checking in the UI context allows embodiments to support central performance optimization. Thus if (as in the convention approach) enforcement points are distributed within the application logic, then modification requires adapting multiple coding locations (which may come from different organizations). However, if only a single enforcement point is located within the UI framework, then any change can be implemented centrally at that location.

Still another possible drawback of conventional approaches, is that authorization traces cannot trace the data at the most suitable layer. By contrast, embodiments offer traceability build in at right place. That is, tracing occurs as the highest level—the UI level—where the entities match directly to what the user is exposed to. For example, a button to release a sales quote is exposed on the UI. If the authorization check is done on lower level, then access to some BO Action is denied, which is traced. Matching that the BO Action maps to this button on the UI has to be performed by the person checking the trace. If the trace directly shows that the execution of the button is denied, then this mapping step for the trace reader is not required. The same can apply to data fields.

It is further noted for conventional approaches, authorization checks on operations (which are not bound to the Business Objects model but only relate to a UI floorplan), cannot be executed without manual coding. By contrast, embodiments provide modeled support of authorization checks on UI entities that are not bound to the business layer. An example is UI logic, such as an "Export to Excel™" button for which no action exists in the backend.

Thus separate SEND BY MAIL, DOWNLOAD TO EXCEL, or PRINT options may exist. These may not all be related to the Business Object, but some agents are started (like a printing engine) or the event triggers only a central functionality of the UI framework (like the Excel™ download).

Figure 3:
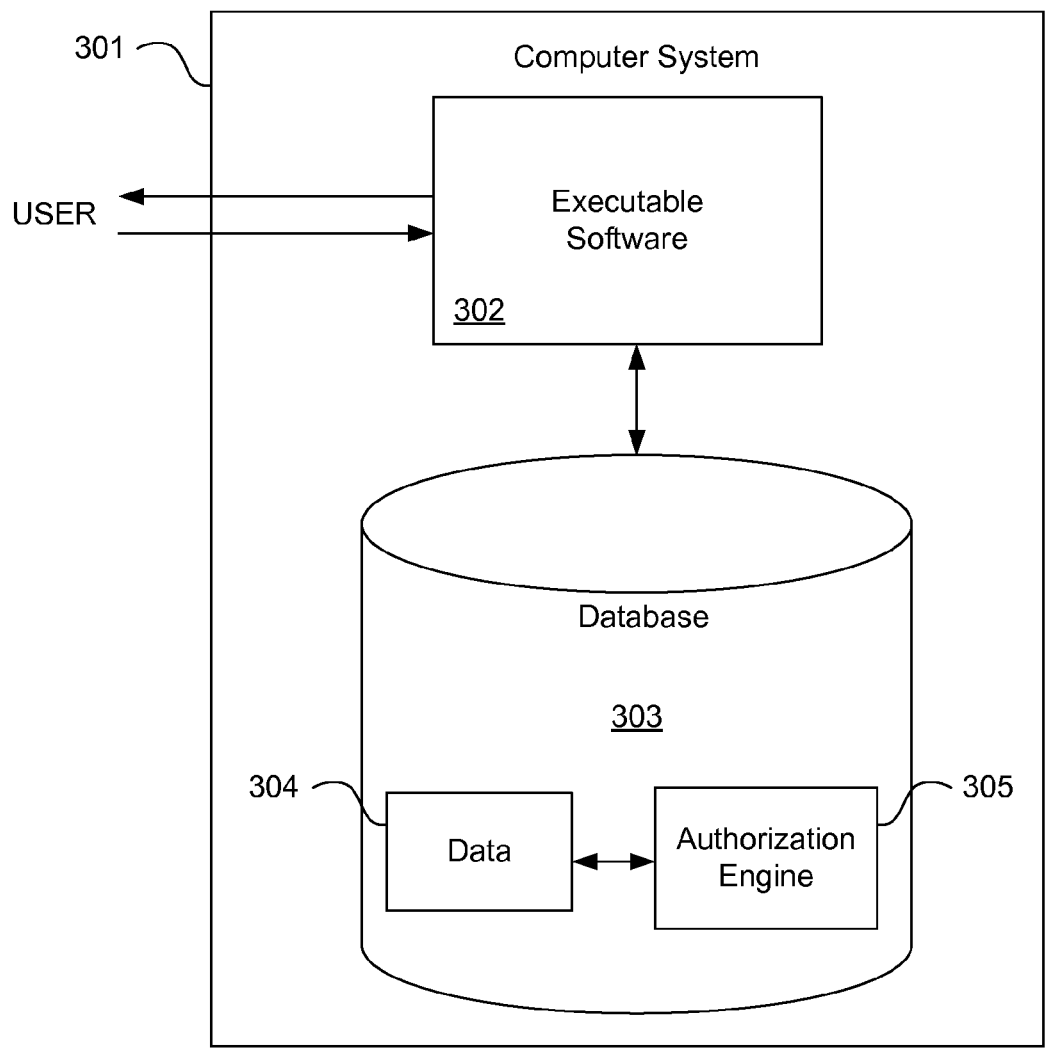
FIG. 3 illustrates hardware of a special purpose computing machine configured to perform modeled authorization checking according to an embodiment.

FIG. 3 illustrates hardware of a special purpose computing machine configured to perform authorization checking according to an embodiment. In particular, computer system 300 comprises a processor 302 that is in electronic communication with a non-transitory computer-readable storage medium 303. This computer-readable storage medium has stored thereon code 305 corresponding to an authorization engine. Code 304 corresponds to a data model. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 4:
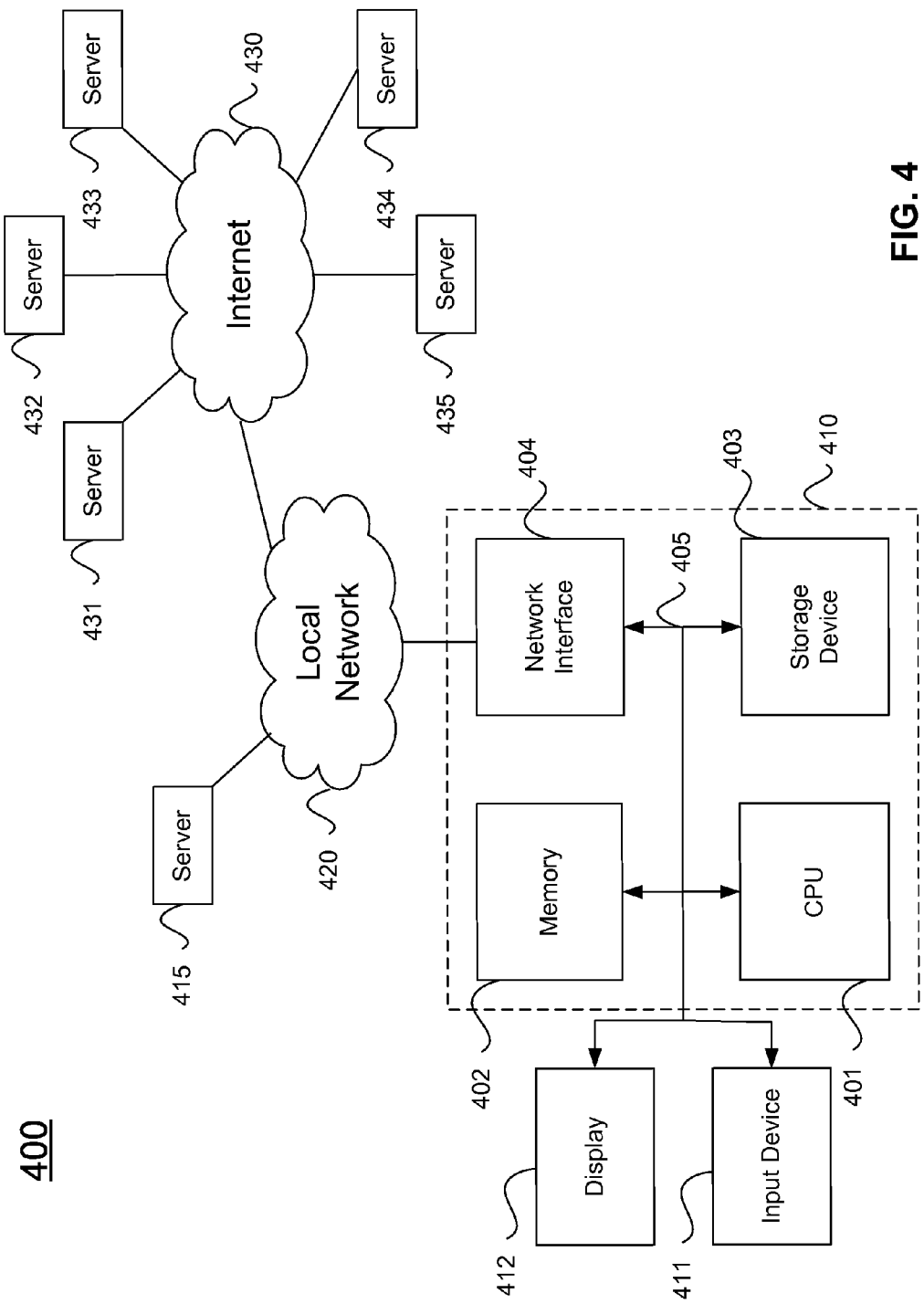
FIG. 4 illustrates an example of a computer system.

An example computer system 410 is illustrated in FIG. 4. Computer system 410 includes a bus 405 or other communication mechanism for communicating information, and a processor 401 coupled with bus 405 for processing information. Computer system 410 also includes a memory 402 coupled to bus 405 for storing information and instructions to be executed by processor 401, including information and instructions for performing the techniques described above, for example. This memory may also be used for storing variables or other intermediate information during execution of instructions to be executed by processor 401. Possible implementations of this memory may be, but are not limited to, random access memory (RAM), read only memory (ROM), or both. A storage device 403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 403 may include source code, binary code, or software files for performing the techniques above, for example. Storage device and memory are both examples of computer readable mediums.

Computer system 410 may be coupled via bus 405 to a display 412, such as a cathode ray tube (CRT) or liquid crystal display (LCD), for displaying information to a computer user. An input device 411 such as a keyboard and/or mouse is coupled to bus 405 for communicating information and command selections from the user to processor 401. The combination of these components allows the user to communicate with the system. In some systems, bus 405 may be divided into multiple specialized buses.

Computer system 410 also includes a network interface 404 coupled with bus 405. Network interface 404 may provide two-way data communication between computer system 410 and the local network 420. The network interface 404 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 404 sends and receives electrical, electromagnetic, or optical signals that carry digital data streams representing various types of information.

Computer system 410 can send and receive information, including messages or other interface actions, through the network interface 404 across a local network 420, an Intranet, or the Internet 430. For a local network, computer system 410 may communicate with a plurality of other computer machines, such as server 415. Accordingly, computer system 410 and server computer systems represented by server 415 may form a cloud computing network, which may be programmed with processes described herein. In the Internet example, software components or services may reside on multiple different computer systems 410 or servers 431-435 across the network. The processes described above may be implemented on one or more servers, for example. A server 431 may transmit actions or messages from one component, through Internet 430, local network 420, and network interface 404 to a component on computer system 410. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    providing an authorization meta data model bound to an existing user interface (UI) meta data model in an application layer overlying a database layer, the authorization meta data model part of a Model, View, and Control (MVC) design comprising,
        a data model describing data elements within the UI meta data model and including a first authorization binding,
        a layout, and
        an event model modeling events occurring in the UI meta data model and defining reaction on the events, the event model including a second authorization binding;
    providing an authorization object in a meta data repository;
    providing a single authorization enforcement point in the application layer;
    in response to an authorization request received at the single authorization enforcement point, causing an authorization engine to reference the authorization object; and
    based upon processing of the authorization object by the authorization engine, causing the authorization engine to provide an authorization.

2. A method as in claim 1 wherein:
    the authorization object comprises a document; and
    the authorization applies to an entire document instance.

3. A method as in claim 1 wherein the authorization object comprises a business partner or an organizational center.

4. A method as in claim 1 wherein:
    the authorization object comprises a document and an operation to be performed on the document; and
    the authorization applies to the operation.

5. A non-transitory computer readable storage medium embodying a computer program for performing a method, said method comprising:
    providing an authorization meta data model bound to an existing user interface (UI) meta data model, in an application layer overlying a database layer, the authorization meta data model part of a Model, View, and Control (MVC) design comprising,
        a data model describing data elements within the UI meta data model and including a first authorization binding,
        a layout, and
        an event model modeling events occurring in the UI meta data model and defining reaction on the events, the event model including a second authorization binding;
    providing an authorization object in a meta data repository;
    providing a single authorization enforcement point in the application layer;
    in response to an authorization request received at the single authorization enforcement point, causing an authorization engine to reference the authorization object; and
    based upon processing of the authorization object by the authorization engine, cause the authorization engine to provide an authorization.

6. A non-transitory computer readable storage medium as in claim 5 wherein:
    the authorization object comprises a document; and
    the authorization applies to an entire document instance.

7. A non-transitory computer readable storage medium as in claim 5 wherein the authorization object comprises a business partner or an organizational center.

8. A non-transitory computer readable storage medium as in claim 5 wherein:
    the authorization object comprises a document and an operation to be performed on the document; and
    the authorization applies to the operation.

9. A computer system comprising:
    one or more processors;
    a software program, executable on said computer system, the software program configured to:
    provide an authorization meta data model bound to an existing user interface (UI) meta data model, in an application layer overlying a database layer, the authorization meta data model part of a Model, View, and Control (MVC) design comprising,
        a data model describing data elements within the UI meta data model and including a first authorization binding,
        a layout, and
        an event model modeling events occurring in the UI meta data model and defining reaction on the events, the event model including a second authorization binding;
    provide an authorization object in a meta data repository;
    provide a single authorization enforcement point in the application layer;
    in response to an authorization request received at the single authorization enforcement point, cause an authorization engine to reference the authorization object; and
    based upon processing of the authorization object by the authorization engine, cause the authorization engine to provide an authorization.

10. A computer system as in claim 9 wherein:
    the authorization object comprises a document; and
    the authorization applies to an entire document instance.

11. A computer system as in claim 9 wherein:
the authorization object comprises a document and an operation to be performed on the document; and
the authorization applies to the operation.

\* \* \* \* \*